United States Patent
Kago et al.

(10) Patent No.: US 8,781,478 B2
(45) Date of Patent: Jul. 15, 2014

(54) HANDOVER CONTROL APPARATUS, HANDOVER CONTROL METHOD, AND PROGRAM PRODUCT

(75) Inventors: Yoshiyuki Kago, Nishio (JP); Michio Shamoto, Konan (JP); Yoichi Yoshikura, Obu (JP)

(73) Assignee: Denso Corporation, Kariya (JP)

( * ) Notice: Subject to any disclaimer, the term of this patent is extended or adjusted under 35 U.S.C. 154(b) by 396 days.

(21) Appl. No.: 13/066,621

(22) Filed: Apr. 20, 2011

(65) Prior Publication Data

US 2011/0263257 A1   Oct. 27, 2011

(30) Foreign Application Priority Data

Apr. 22, 2010 (JP) .................................. 2010-99100

(51) Int. Cl.
  *H04W 36/00* (2009.01)
  *H04W 36/24* (2009.01)
  *H04W 36/32* (2009.01)
(52) U.S. Cl.
  CPC .......... *H04W 36/0083* (2013.01); *H04W 36/32* (2013.01); *H04W 36/245* (2013.01)
  USPC .............................. 455/441; 455/437; 370/331
(58) Field of Classification Search
  None
  See application file for complete search history.

(56) References Cited

U.S. PATENT DOCUMENTS

| | | | |
|---|---|---|---|
| 2001/0006514 A1 * | 7/2001 | Park ............................ | 370/331 |
| 2004/0110524 A1 | 6/2004 | Takano et al. | |
| 2004/0264412 A1 | 12/2004 | Arimitsu | |
| 2009/0270105 A1 | 10/2009 | Kakumaru | |
| 2010/0056157 A1 * | 3/2010 | Verona et al. ................. | 455/438 |
| 2010/0255845 A1 | 10/2010 | Kitaji | |

FOREIGN PATENT DOCUMENTS

| | | |
|---|---|---|
| GB | 2337184 | 11/1999 |
| JP | 11-215545 | 8/1999 |
| JP | 2000-197093 | 7/2000 |
| JP | 2004-260477 | 9/2004 |
| JP | 2006-310973 | 11/2006 |
| JP | 2007-306510 | 11/2007 |
| JP | 2009-60295 | 3/2009 |

OTHER PUBLICATIONS

Office Action mailed Jun. 19, 2012 in corresponding Japanese Application No. 2010-099100 (with English translation).

* cited by examiner

*Primary Examiner* — German J Viana Di Prisco
(74) *Attorney, Agent, or Firm* — Hardness, Dickey & Pierce, PLC (57) ABSTRACT

In a handover control apparatus, a terminal is wirelessly connected with one of base stations to establish a wireless data communications connection. The terminal executes a handover process using a handover process section when an electric wave state becomes lower than a threshold value, which is variable. The threshold value can be adjusted according to a moving speed of the terminal. Furthermore, the threshold value is corrected according to the past electric wave state. The threshold value is corrected according to a difference of (i) a minimum electric wave state in a preceding handover process, and (ii) a lower limit. The correction is executed so as to reduce an excessive decline of an electric wave state in a succeeding handover process. Deterioration of a communications quality during a handover process can be thereby suppressed.

9 Claims, 10 Drawing Sheets

FIG. 14

HANDOVER CONTROL APPARATUS, HANDOVER CONTROL METHOD, AND PROGRAM PRODUCT

CROSS REFERENCE TO RELATED APPLICATION

The present application is based on and incorporates herein by reference Japanese Patent Application No. 2010-99100 filed on Apr. 22, 2010.

FIELD OF THE INVENTION

The present invention relates to a wireless communications technology, in particular, a handover control apparatus for switching base stations for connecting with a terminal in response to a movement of the terminal.
Further, it relates to a handover control method, and a program product for providing the handover control apparatus and the handover method.

BACKGROUND OF THE INVENTION

[Patent document 1] JP-2004-260477 A
[Patent document 2] JP-2000-197093 A
[Patent document 3] JP-2005-20458 A (US 2004/0264412 A1)
[Patent document 4] JP-2006-310973 A
[Patent document 5] JP-2008-98880 A (US 2009/0270105 A1)

There is conventionally known a wireless communications system to provide wireless communications with a movable terminal by arranging several base stations so as to provide wireless communications areas to be overlapped with each other. Such a system uses a handover process (also referred to as an HO process) to switch automatically base stations to be connected with the terminal in response to the movement of the terminal. The HO process is required to operate so as not to reduce a communications quality.

As starting, the HO process searches another base station that provides a more effective electric wave state or level for communications. Next, the HO process switches a connection destination from the base station presently connected or communicating into the base station providing the more effective electric wave state.

Thus, the resources for data communications are restrained for the duration corresponding to the search and the switchover. As a result, there may be arising a lack of data such as a packet loss. Furthermore, before completing the HO process, the terminal may exit from the wireless communications area of the base station presently connected; thus, there may be arising an interruption of data communications. For example, the terminal may move at a high speed when the HO process is executed to switch from one base station to another base station. Such a case may cause a communications quality to deteriorate temporarily or the data communications to interrupt. The terminal executes an application, which needs successive data communications, like streaming of moving images or sounds. Under such an operating environment, there is arising a problem such as a partial lack of images or sounds, or a halt for re-buffering. Thus, there is a problem that a high communications quality is not provided to a user of the terminal.

In order to solve such a problem, there are conventionally proposed apparatuses and methods for the HO process, as described in Patent documents 1 to 5.

The technology of Patent documents 1, 2 sets up a threshold value for starting a HO process according to the moving speed of the terminal. In such a technology, as the moving speed becomes higher, the threshold value becomes higher. As the moving speed becomes higher, the HO process is started at an earlier stage.

It is noted that, in such a technology, the threshold value relative to a certain moving speed is not changed. Therefore, the communications quality may deteriorate during the HO process depending on an electric wave variation factor which fluctuates the electric wave state between the base station and the terminal. For example, the electric wave variation factor includes a difference in the reception sensitivity between terminals, a difference in the reception sensitivity between the models of terminals, and a difference in the communications environment due to the positional relation between the base station and the terminal.

The technology of Patent document 3 discloses a technique to select a suitable base station from several base stations. However, this technology cannot prevent the deterioration of the electric wave state in case that the terminal moves at a high speed. In addition, the communications quality may deteriorate during the HO process depending on the electric wave variation factor.

The technology of Patent document 4 uses a value, which is so-called a quality offset, so as to determine whether to start the HO process. Further, the quality offset is decreased when the HO process is successful, to thereby start a succeeding HO process at an earlier stage. Further, the quality offset is increased when the HO process is unsuccessful, to thereby start the next HO process at a later stage. This signifies that the above technology adjusts the starting condition of the HO process depending on whether the precedent HO process is successful or unsuccessful. However, in this conventional technology, the start condition of the HO process is not improved until the HO process once fails. Thus, there is a problem that a high communications quality may not provided to a user of the terminal.

The technology of Patent document 5 discloses implementation of two threshold values: the first threshold value serving as a start condition in case a HO permission instruction is issued from an application; and the second threshold value serving as a start condition in case a HO prohibition instruction is issued from an application. It is noted that this technology provides both of the threshold values to be fixed values, respectively. This cannot prevent the deterioration of the electric wave state in case that the terminal moves at a high speed. In addition, the communications quality may deteriorate during the HO process depending on the electric wave variation factor.

Thus, in the conventional technologies, the threshold value for starting the HO process may not be set up appropriately. Therefore, there is a problem that deterioration of the communications quality is not suppressed in the HO process.

SUMMARY OF THE INVENTION

The present invention is made in view of the above problem. It is an object of the present invention to suppress a deterioration of a communications quality during a handover process (HO process).

Another object is to suppress a deterioration of the communications quality in the HO process, even if a moving speed of a terminal changes.

Yet another object is to suppress a deterioration of the communications quality in the HO process, even if an electric wave variation factor changes.

Still yet another object is to suppress a deterioration of the communications quality in the next HO process based on a past electric wave state.

To achieve the above objects, according to an example of the present invention, a handover control apparatus is provided as follows. A setup section is configured to set up a threshold value, which is predetermined. A determination section is configured to determine a start of a handover process when an electric wave state becomes lower than the threshold value. Herein, the electric wave state is between a terminal and a first base station wirelessly connected with the terminal to establish a wireless data communications link; the handover process wirelessly connects the terminal to a second base station different from the first base station. The setup section is further configured to include a correction section to correct the threshold value based on a past electric wave state, which is an electric wave state undergone in past times, so as to reduce a decline of an electric wave state in a following handover process, which is a handover process that will be started.

According to the above configuration, the decline of the electric wave state in the following handover process (HO process) can be suppressed. Deterioration of a communications quality during a handover process can be thereby suppressed.

According to another example of the present invention, a handover control method is provided for starting a handover process when an electric wave state between a terminal and a base station presently connected becomes lower than a threshold value, the handover process wirelessly connecting the terminal to an other base station different from the base station presently connected. The method includes (i) specifying a past electric wave state, which is an electric wave state undergone in past times and (ii) correcting the threshold value based on the past electric wave state specified so as to reduce a decline of an electric wave sate in a following handover process, which is a handover process that will be started.

According to yet another example of the present invention, a program product is provided as follows. The program produce is stored in a non-transitory computer readable storage medium comprising instructions for execution by a computer, the instructions including the above mentioned method, the method being computer-implemented.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

The following explains several embodiments with reference to the drawings. Each embodiment may have a portion corresponding to that of a precedent embodiment; such mutually corresponding portions are assigned with an identical reference number so as to omit overlapped explanation. When only a portion of the configuration of each embodiment is explained, the other portion of the configuration may adopt that of the preceding embodiment previously explained. Partial combination between the embodiments may be possible with respect to not only the portions which are explicitly described in each embodiment, but also the portions which are not explicitly described if a problem does not arise.

(First Embodiment)

Figure 1:
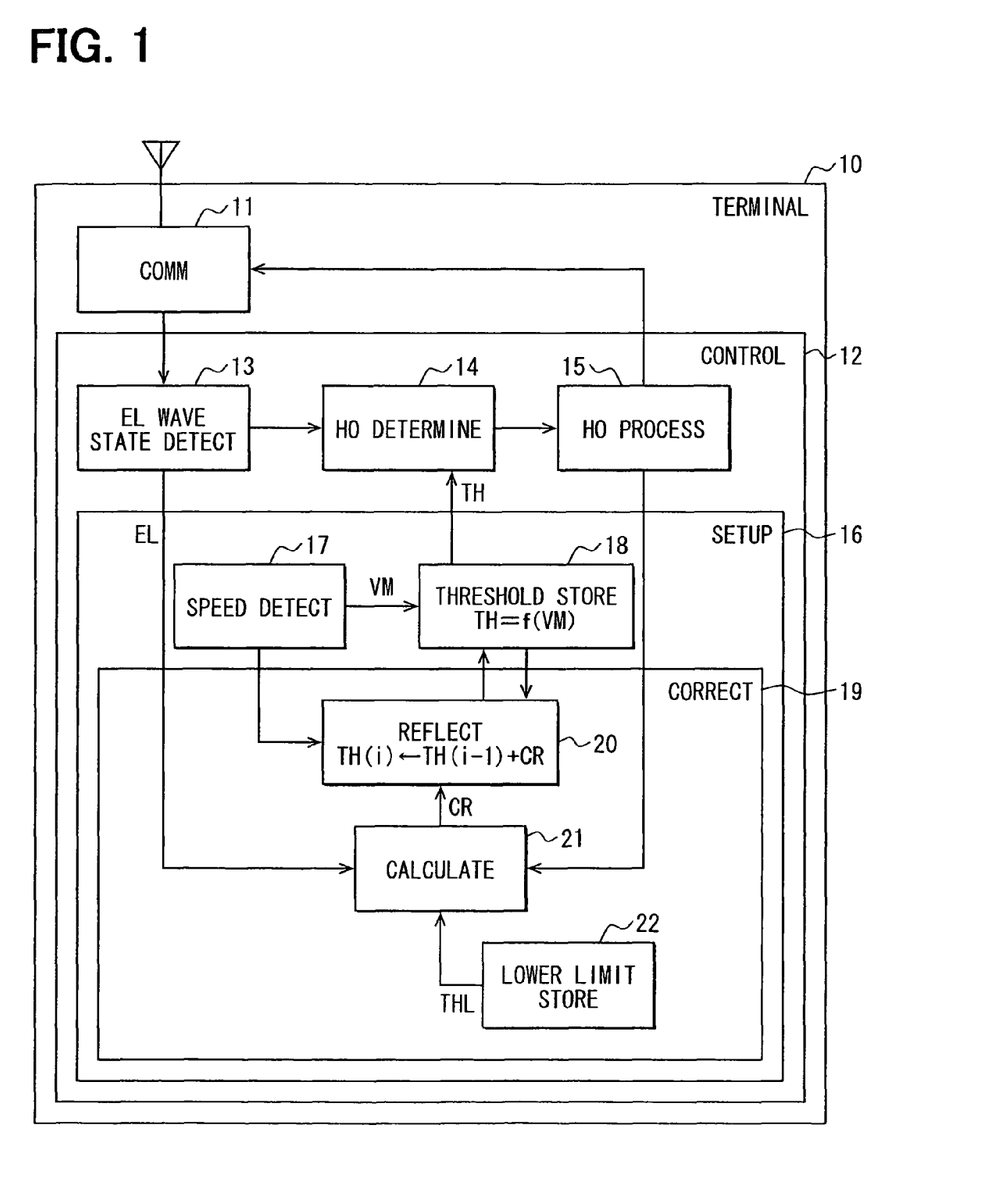
FIG. 1 is a diagram illustrating a configuration of a terminal according to a first embodiment of the present invention.
Figure 2:
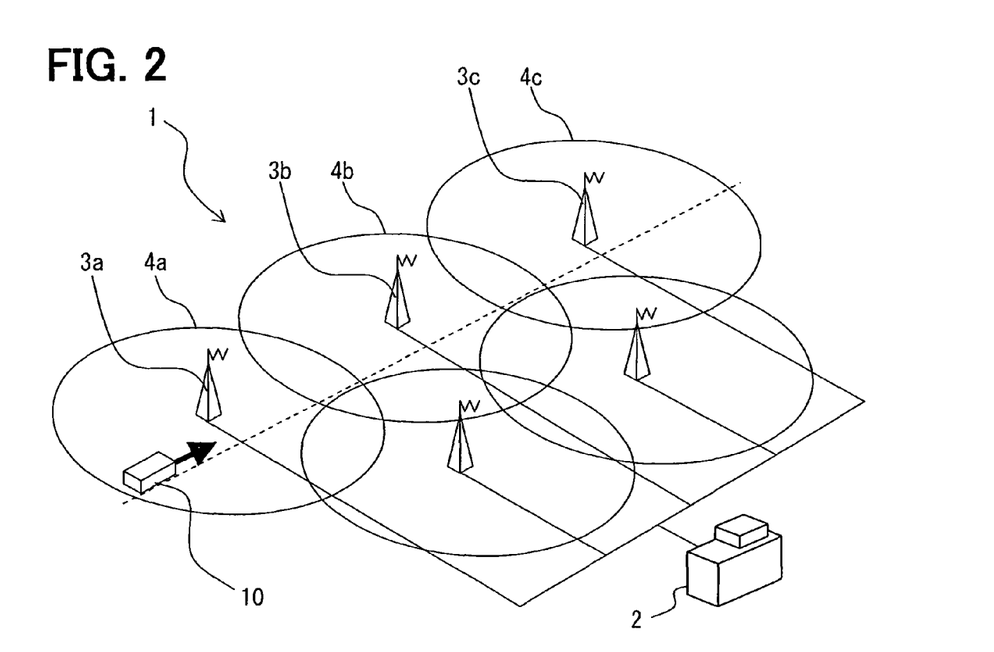
FIG. 2 is a perspective view illustrating a communications system according to the first embodiment.
Figure 3:
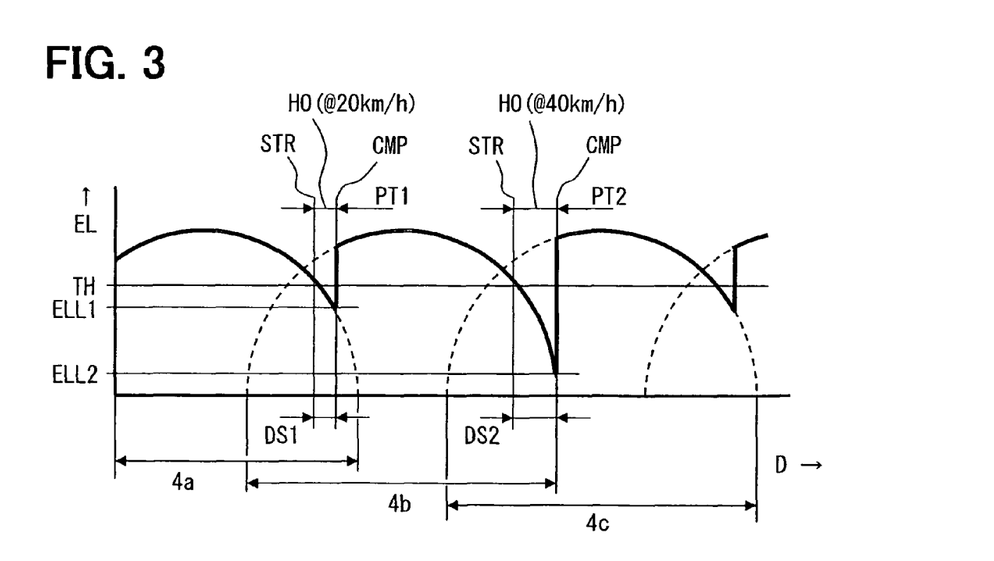
FIG. 3 is a diagram illustrating an electric wave state according to the first embodiment.

FIG. 1 is a diagram illustrating a configuration of a terminal according to a first embodiment of the present invention. FIG. 2 is a perspective view illustrating a communications system according to the first embodiment. FIG. 3 is a diagram illustrating an electric wave state according to the first embodiment.

In FIG. 2, a communications system 1 includes a fixed station 2 that is fixed or stationary, several base stations 3a, 3b, 3c, . . . , and a terminal 10 that is movable. The fixed station 2 and the terminal 10 execute two-way communications of digital data via the wireless communications link. The fixed station 2 is connected with the several base stations 3a, 3b, and 3c. Each base station 3a, 3b, 3c provides a communications area which enables the wireless communications. The several base stations 3a, 3b, 3c are arranged such that those communications areas 4a, 4b, 4c overlap partially with each other. The communications area is also called a cell. The terminal 10 is a portable wireless terminal or in-vehicle terminal mounted in a vehicle. In the following explanation, the terminal 10 is supposed to be mounted in a subject vehicle. The terminal 10 mounted in the vehicle moves so as to pass through within each of the several communications area 4a, 4b, 4c in order. In the communications system 1, the terminal 10 includes a handover control apparatus for executing a handover control method which switches base stations so as to establish a wireless communications connection between the terminal 10 and the wireless communications link. The base stations are switched therebetween in the handover process so as to maintain the continuous wireless data communications link or connection. When the terminal 10 moves from the area 4a into the area 4b, the terminal 10 is switched from the state establishing the connection with the base station 3a into the state establishing the connection with the base station 3b. Such a switchover process is called a handover process. Hereinafter, the handover is also referred to as HO.

FIG. 3 illustrates an electric wave state in case that the terminal 10 moves through the several areas 4a, 4b, and 4c, in order. The axis of abscissa indicates a movement distance D. The axis of ordinates indicates a state or level EL (also referred to as an electric wave state or level EL) of electric waves received by the terminal 10 from the base station. The electric wave state EL is illustrated using a field strength. It is noted that the electric wave state EL may be referred to as an electric field level. The electric wave state EL can be indicated using an index which indicates a strength of electric waves, an index which indicates an error ratio of data, or a combination of the foregoing indices. For example, RSSI (Received Signal Strength Indicator) or CINR (Carrier to Interference-plus-Noise Ratio) can be used as an index which indicates the strength of the electric wave. In addition, PER (Packet Error Rate), BER (Bit Error Rate), or FER (Frame Error Rate) can be used as an index which indicates the error ratio. The electric wave state may be indicated by a combination of the several indices which indicate the strength of electric waves. In addition, the electric wave state may be indicated using a combination of two or more kinds of error ratios.

The HO process is started when both the following conditions are satisfied: when the terminal 10 moves from one area to another area, there is another base station which provides the electric wave state higher than the electric wave state of the base station which presently establishes the wireless communications connection with the terminal; and the electric wave state EL of the base station presently establishing the connection becomes less than a predetermined threshold value TH.

The predetermined threshold value TH is also called a HO start threshold value. The HO process needs a fixed time period to operate. Therefore, when the moving speed of the terminal 10 differs, the movement distance of the terminal 10 after starting the HO process also differs. As a result, the electric wave state ELs just before completing the HO process differs according to the moving speed of the terminal 10.

In FIG. 3, HO (@20 km/h) indicates the HO process taking place when the terminal 10 moves at 20 km/h. In such a case, the HO process is started at time STR. After the HO process takes a time period PT1, the HO process is completed at a time CMP. In the time period PT1, the terminal 10 moves by a distance DS1. A minimum electric wave state ELL1 is observed at a time just before completing the HO process.

Further, in FIG. 3, HO (@40 km/h) indicates the HO process taking place when the terminal 10 moves at 40 km/h. In the time period PT2 necessary for the HO process, the terminal 10 moves by a distance DS2. A minimum electric wave state ELL2 is observed at a time just before completing the HO process. The time period PT1 and the time period PT2 are almost the same. In contrast, the distance DS2 is twice the distance DS1. Therefore, when the terminal 10 reaches an outer edge of the area 4b, the electric wave state ELL2 reaches a low value close to the limit for maintaining the communications. Such a case may cause a lack of data or a temporary communications interception during the HO process.

In addition, the electric wave state EL varies depending on the various variation factors. Therefore, the electric wave state EL may reach a low value during the HO process. Such a case may cause a lack of data or a temporary communications interception during the HO process.

In the present embodiment, in order to enable an adjustment of the start time of a HO process, the threshold value TH is made variable. The threshold value TH is set up according to the moving speed, in order to suppress the difference of the communications quality resulting from the difference of the moving speed. In detail, the threshold value TH is adjusted to be higher as the moving speed becomes higher. As a result, the HO process is started earlier (i.e., at an earlier stage) as the moving speed becomes higher.

Furthermore, the threshold value TH is corrected according to a past electric wave state. For instance, when the past electric wave state is bad enough to reduce the communications quality to the level below a predetermined value, the threshold value TH is corrected to be higher. As a result, the HO process is started earlier, as the past electric wave state becomes worse. The past electric wave state can be acquired based on the electric wave state ELL2 in a precedent HO process. The electric wave state ELL2 in the precedent HO process may be supposed to predict or estimate a minimum electric wave state ELL in a succeeding HO process, which is defined as being subsequent to the precedent HO process. In other words, if a HO process at the present time is referred to as a precedent HO process, a HO process at the next time is referred to as a succeeding HO process. Further, if a HO process at the previous time is referred to as a precedent HO process, a HO process at the present time is referred to as a succeeding HO process. Then, the threshold value is corrected based on the electric wave state ELL2 in the precedent HO process. For instance, the threshold value TH becomes higher as the electric wave state ELL2 becomes lower with respective to the lower limit THL. In other words, the threshold value TH is corrected so that the HO process may be started at an earlier stage. Thereby, it is avoidable that the electric wave state EL in the period of the succeeding HO process falls excessively.

With reference to FIG. 1, the terminal 10 is provided with a communications apparatus 11 and a control apparatus 12. The communications apparatus 11 is a transceiver which transmits data to the base station and receives data from the base station via the wireless communications link. The control apparatus 12 is provided with a microcomputer having a CPU and a storage medium read by a computer. The storage medium stores a program which can be read by a computer. The storage medium may be a memory. The program is executed by the control apparatus, thereby enabling the control apparatus to function as an apparatus described in the present specification and execute a process of the control method described in the specification.

The control apparatus 12 is provided with several functional processing means or sections. Each processing means or section attains a predetermined function. These processing means or sections may be provided by programs. The means or section provided by the control apparatus can be also called a module or a functional block which attains a predetermined function.

The control apparatus 12 is provided with an electric wave detection means or section 13, a HO determination means or section 14, a HO process means or section 15, and a setup means or section 16. The electric wave detection means 13 detects from the communications apparatus 11 an electric wave state EL which indicates the state of the electric wave supplied from the base station. The HO determination means 14 determines whether a start time of the HO process comes by comparing the electric wave state EL with the threshold value TH. It is noted that the HO process is started when the electric wave state EL becomes less than the threshold value TH. The HO process means 15 starts the HO process when the start of the HO process is determined by the HO determination means 14. The HO process means 15 controls the communications apparatus 11. The HO process means 15 searches for the base station which can communicate, interrupt the communications with the base station presently communicating, and establish the communications with the next base station. The setup means 16 sets up the threshold value TH.

The setup means 16 is provided with a speed detection means or section 17, a threshold value storage means or section 18, and a correction means or section 19. The speed detection means 17 detects the moving speed VM of the terminal 10.

In this embodiment, the moving speed (also referred to as VM) uses a speed signal of the vehicle mounted with the terminal 10. The speed signal of the vehicle can be acquired from a vehicle speed pulse of the vehicle. The moving speed VM can be detected with the various techniques. For example, based on the position information of the vehicle, the moving speed is computable. The position information can be acquired from a GPS (Global Positioning System). In addition, based on the electric wave from the base station, the moving speed is computable. In this technique, the field strength of the electric wave of the base station (e.g., RSSI) is observed periodically. The magnitude of attenuation is calculated from the output power of the base station. The distance from the base station is calculated. Next, a movement distance per unit time is obtained using (i) the distance from the base station calculated at the previous time and (ii) the distance from the base station calculated at the present time, thereby calculating the moving speed. In such a case, the electric wave from the same base station is monitored periodically. The attenuation of the electric wave is proportional to the square of the distance in a free space. In the urban environment, the multi-pass etc. is generated; thus, the attenuation of the electric wave is said to be proportional to the 3.4th power of the distance. When the movement locus of the terminal 10 forms a circle, the distance from the base station is kept constant. This disables the calculation of the moving speed. In addition, the distance from the base station cannot be found immediately after the execution of the HO process. In addition, the field strength of the electric wave from the base station is observed periodically; the moving speed can be obtained from the inclination degree of the electric field strength. In addition, the image is analyzed which is acquired from the terminal 10 or a monitor camera provided in the vehicle; the moving speed can be detected by evaluating the positional relation with a static object. In addition, the moving speed is detectable with the radar apparatus provided in the terminal 10 or the vehicle.

The threshold value storage means 18 stores the threshold value TH. The threshold value TH is stored as a table or a function (i.e., functional equation) using the moving speed VM as a parameter. In the table, the threshold values TH0–THn are stored in correspondence with the several speed ranges VM0 to VMn, respectively. Therefore, the table associates the moving speed VM and the threshold value TH with each other. The threshold value TH can be expressed as TH=f (VM), where f is a function. The threshold value storage means 18 searches the table according to the moving speed VM given from the speed detection means 17, and outputs the obtained or retrieved threshold value TH to the HO determination means 14. The threshold value storage means 18 may be a non-volatile memory device included in the control apparatus 12. The table is stored in the non-volatile memory device. The table stored in the threshold value storage means 18 is set up such that as the moving speed VM becomes faster or higher, the threshold value TH becomes higher.

The correction means 19 corrects the threshold value TH stored in the threshold value storage means 18. In other words, the threshold value TH stored in the threshold value storage means 18 is updated by the correction means 19; namely, the threshold value TH is corrected by rewriting. Therefore, the threshold value TH outputted to the HO determination means 14 from the threshold value storage means 18 is a value after the correction. In other words, the correction means 19 is a learning means to update the table stored in the threshold value storage means 18, thereby learning the threshold value necessary for executing the HO process desirably. The learned threshold value is stored in the threshold value storage means 18 to be used for the determination for starting the succeeding HO process.

The correction means 19 includes a reflection means or section 20, a calculation means or section 21, and a lower limit storage means or section 22. The reflection means 20 reflects a correction amount CR on the threshold value TH to thereby correct the threshold value TH. The reflection means 20 can also be called an update means to update the value of the threshold value TH stored in the threshold value storage means 18. The reflection means 20 adds the correction amount CR to the threshold value TH(i−1) before the correction to obtain the threshold value TH(i) after the correction, updating the data stored in the threshold value storage means 18. The threshold value before the correction may be referred to as the pre-correction threshold value; the threshold value after the correction may be referred to as the post-correction threshold value. The update process is executed with respect to the threshold values THk–THn corresponding to the moving speed greater than the moving speed VMk at the time of the HO process. This correction equation is TH(i)=TH(i−1)+CR. The calculation means 21 calculates a correction amount CR. The correction amount CR is calculated based on the electric wave state EL during the HO process (i.e., for a period of the HO process). The correction amount CR is calculated based on the decrease amount of the electric wave state EL during a HO process, so as to suppress the deterioration of the electric wave state EL during a HO process. The correction amount CR is calculated so as to maintain the electric wave state EL during a HO process higher than the predetermined lower limit THL. The calculation means 21 calculates the correction amount CR as a difference between (i) the minimum electric wave state ELL just prior to the completion of the HO process and (ii) the lower limit THL.

Figure 4:
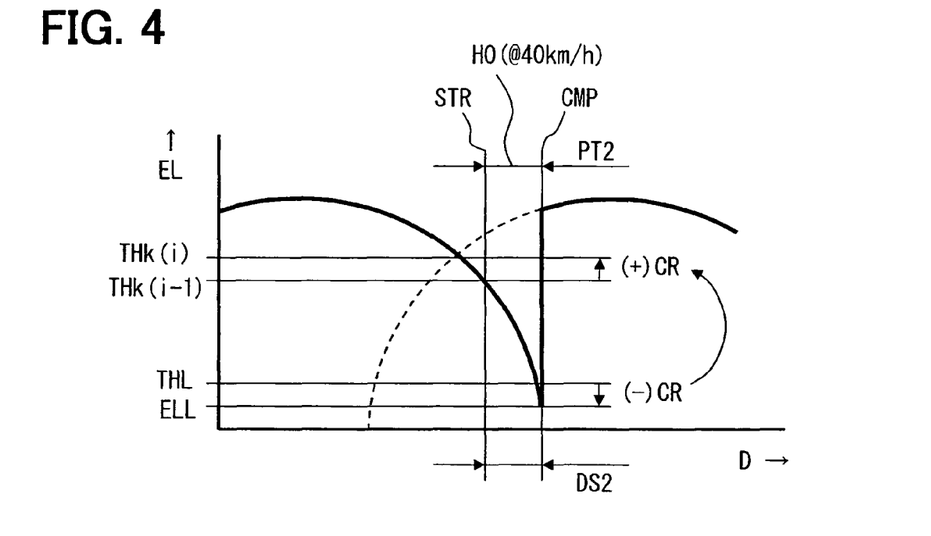
FIG. 4 is a diagram illustrating a correction process according to the first embodiment.
Figure 5:
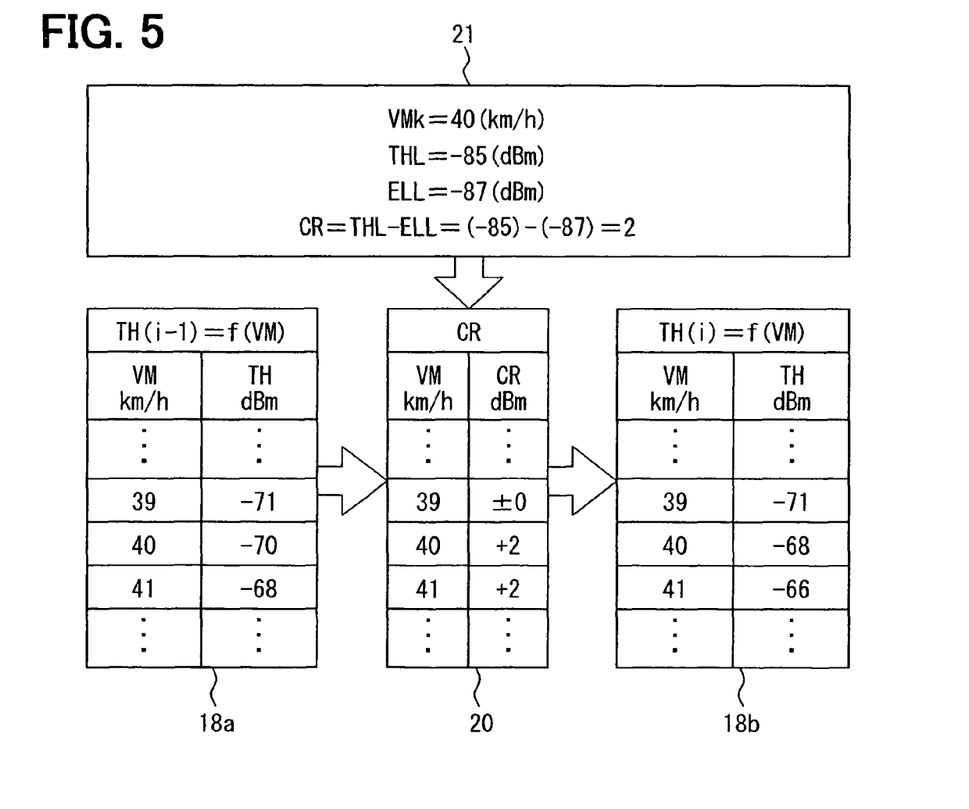
FIG. 5 is a block diagram illustrating a correction process according to the first embodiment.

The lower limit threshold value storage means 22 stores the lower limit threshold value THL. The lower limit THL is a predetermined value. The lower limit THL indicates a minimum value of the electric wave state EL which can provide a desirable communications quality. In addition, the lower limit THL is used to detect the degradation amount of the electric wave state EL; it is also called a degradation threshold value. When the electric wave state EL is an electric field, the lower limit THL is also called an electric field degradation threshold value. The lower limit THL which the lower limit storage means 22 stores can be a fixed value or a variable value. When the lower limit THL is variable, the lower limit storage means 22 can be configured to store a table for setting up the lower limit THL according to a parameter, such as a moving speed VM. FIG. 4 illustrates a correction process according to the first embodiment. The axis of abscissa indicates a movement distance D. The axis of ordinates indicates an electric wave state EL of electric waves received by the terminal 10 from the base station. FIG. 4 indicates a variation of the electric wave state EL in cases that the HO process is executed when the terminal 10 is moving at 40 km/h. This electric wave state EL is detected by the electric wave detection means 13. When the electric wave state EL becomes less than the threshold value THk (i−1), the HO determination means 14 determines the start of the HO process. The HO process is started at a time STR by the HO process means 15. The electric wave state EL falls gradually during the HO process. The electric wave detection means 13 observes an electric wave state EL during the HO process. The electric wave state EL falls to the minimum electric wave state ELL just before the time CMP when the HO process is completed. In cases where the minimum electric wave state ELL during the HO process exhibits a value less than the lower limit THL at the time CMP, the calculation means 21 calculates a correction amount CR. The correction amount CR is calculated as a difference THL−ELL between the lower limit THL and the minimum electric wave state ELL. The reflection means 20 adds the correction amount CR to the threshold value THk (i−1) stored in the threshold value storage means 18, thereby correcting the threshold value THk from the (pre-correction) threshold value THk (i−1) before the correction into the (post-correction) threshold value THk(i) after the correction. When the HO process becomes unsuccessful or goes wrong and the wireless communications link with a base station is shut down, the minimum electric wave state ELL is not acquired. So, when the HO process goes wrong, the threshold value THk (i−1) before the correction is maintained. FIG. 5 is a block diagram illustrating a correction process according to the first embodiment. FIG. 5 is an example where the moving speed VMk of the terminal 10 is 40 km/h, the lower limit THL is −85 dBm, and the minimum electric wave state ELL is detected at the time CMP when the HO process is completed. Before the correction process is executed, the threshold value storage means 18 stores the table 18a. The table 18a indicates an initial value. In the initial value, the threshold value TH is set to a higher value as the moving speed VM becomes higher; thereby, as the moving speed VM becomes higher, the HO process is started at an earlier stage and completed at an earlier stage. In other words, as the moving speed VM becomes higher, the threshold value TH is set up to enable the HO process to start in a more favorable electric wave state. Thereby, even if the moving speed VM becomes higher, the electric wave state during the HO process is kept comparatively higher.

The calculation means 21 calculates the correction amount CR as CR=THL−ELL=(−85)−(−87)=2. The reflection means 20 corrects the threshold value THk corresponding to the moving speed equal to or greater than the moving speed VMk at the time CMP when the HO process is completed. Therefore, the threshold values THk whose moving speeds VM are not less than 40 km/h, THk+1, THk+2, . . . , THn are corrected by adding the correction amount CR. The (pre-correction) table 18a before the correction stored in the threshold value storage means 18 is replaced by the (post-correction) table 18b after the correction by the reflection means 20; the table 18b after the correction is stored in the threshold value storage means 18. For example, the threshold value THk at the moving speed VMk=40 km/h in a precedent HO process is corrected from the threshold value before the correction THk(i−1)=−70 dBm is corrected to the threshold value after the correction THk(i)=−68 dBm, which is used for a succeeding HO process, which will take place subsequent to the precedent HO process. Similarly, the threshold value THk+1 at the moving speed VMk+1=41 km/h is corrected from the pre-correction threshold value THk+1(i−1)=−68 dBm is corrected to the post-correction threshold value THk+1(i)=−66 dBm. In contrast, the threshold value THk−1 in the moving speed VMk−1=39 km/h lower than the moving speed VMk=40km/h at the time CMP when the HO process is completed is maintained. Therefore, the post-correction threshold value THk−1(i)=−71 dBm is identical to the pre-correction threshold value THk−1(i−1)=−71 dBm.

The example illustrated in FIG. 5 is one example for explanation. For example, the moving speed VM may be classified with respect to an optional speed range instead of the range of one km/h, which is exemplified. In addition, the threshold value TH is not limited to the above exemplified value.

Figure 6:
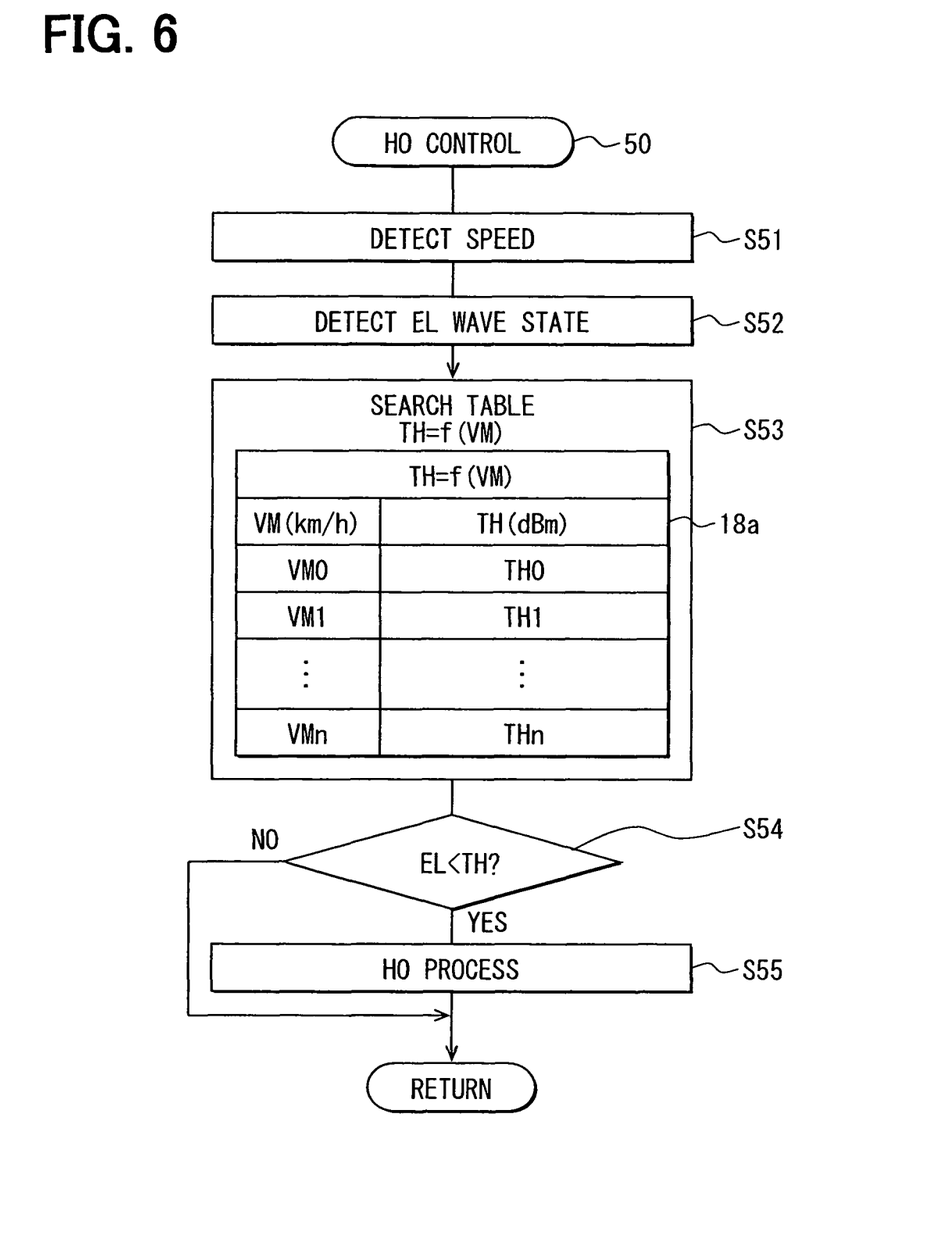
FIG. 6 is a flowchart illustrating a process executed by a terminal according to the first embodiment.

FIG. 6 is a flowchart which illustrates a HO control 50 executed in the terminal 10 according to the first embodiment. Sections or steps in the HO control indicate functions provided by several means or sections 13, 14, 15, 16, 17, 18 included in the control apparatus 12, respectively. In other words, a flowchart or the processing of the flowchart in the present application includes sections (also referred to as steps). Further, each section or step can be divided into several sub-sections while several sections can be combined into a single section. Furthermore, each of thus configured sections can be referred to as a means or unit and achieved not only as a software device but also as a hardware device.

At S51, the control apparatus 12 detects a moving speed VM. At S52, the control apparatus 12 detects an electric wave state EL. At S53, the control apparatus 12 searches the table 18a. By searching the table 18a, the threshold value TH according to moving speed VM is obtained.

At S54, the control apparatus 12 determines whether the electric wave state EL is less than the threshold value TH. When the electric wave state EL is equal to or greater than the threshold value TH, the processing branches to NO and the HO control 50 is repeated. When the electric wave state EL is less than the threshold value TH and gets worse, the processing branches to YES. At S55, the control apparatus 12 executes the HO process.

Figure 7:
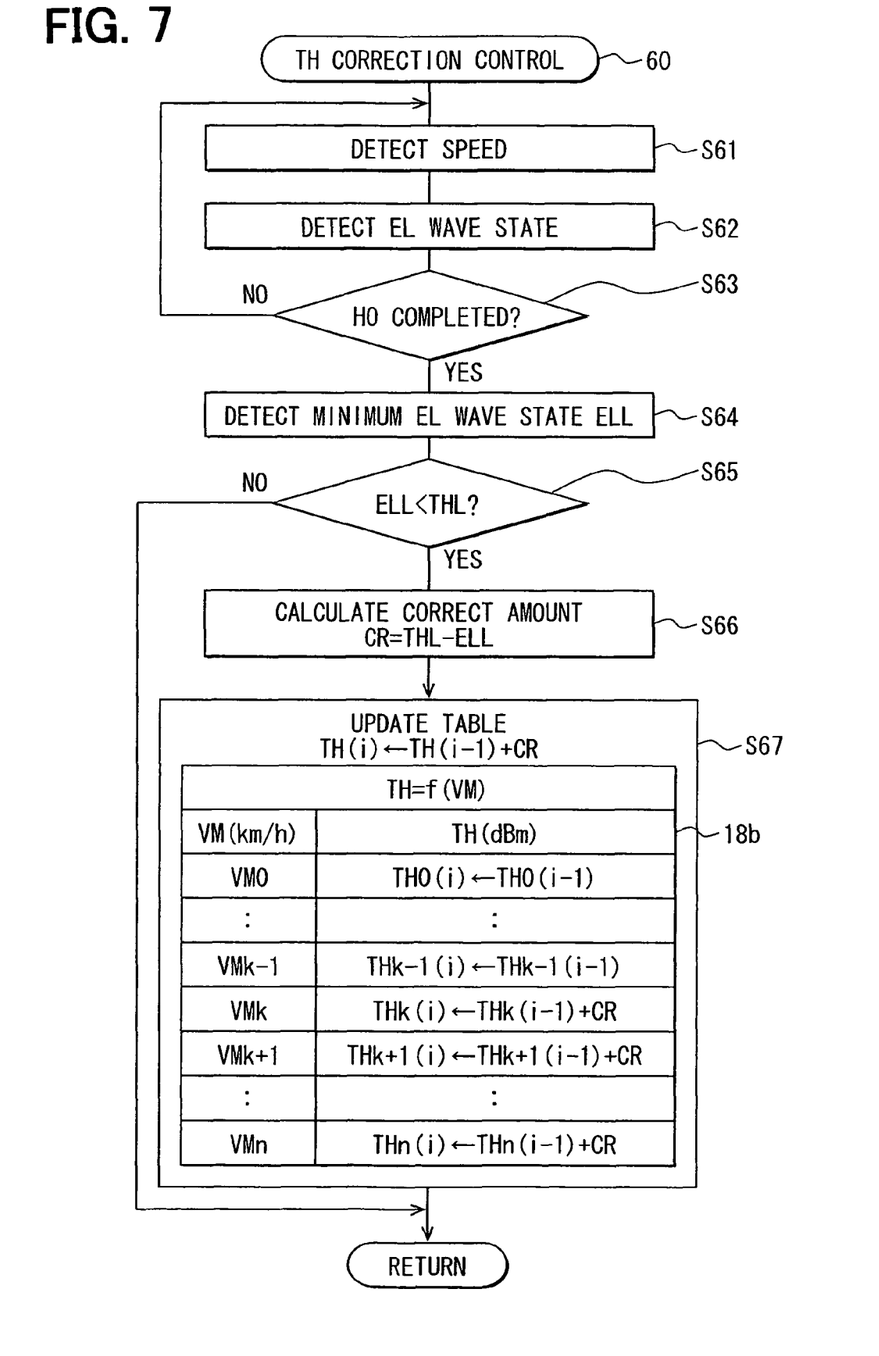
FIG. 7 is a flowchart illustrating a process executed by the terminal according to the first embodiment.

FIG. 7 is a flowchart which illustrates a threshold value correction control 60 executed in the terminal 10 according to the first embodiment. Sections or steps indicates functions provided by several means or sections 19, 20, 21, 22 included in the control apparatus 12.

At S61, the control apparatus 12 detects a moving speed VM. At S62, the control apparatus 12 detects an electric wave state EL. At S63, the control apparatus 12 determines whether or not the HO process is completed. The processing branches to NO to repeat S61 and S62 until the HO process is completed. When the HO process is completed, the processing branches to YES. As a result, the electric wave state EL and moving speed VM during the HO process taking place are observed continuously.

At S64, the minimum electric wave state ELL during the HO process taking place is detected. The minimum electric wave state ELL can be extracted from the data detected at S62 during the HO process taking place. At S65, it is determined whether the minimum electric wave state ELL is less than the lower limit THL. When the electric wave state EL is equal to or greater than the threshold value TH, the processing branches to NO and the threshold value correction control 60 is repeated. When the minimum electric wave state ELL is less than the lower limit THL, the procesing branches to YES.

At S66, the control apparatus 12 calculates a correction amount CR. The correction amount CR is calculated with an equation of CR=THL−ELL.

At S67, the table stored in the control apparatus 12 is updated. The update process is applied to the threshold values THk, THk+1, THn greater than the moving speed VMk at the time CMP when the minimum value ELL is observed. The update process includes an addition process, which adds the correction amount CR to the prior-correction threshold values THk (i−1), THk+1 (i−1), . . . , THn (i−1) and obtains the post-correction threshold values THk(i), THk+1(i), . . . , THn (i). Furthermore, the update process includes a rewrite process, which stores the post-correction threshold values THk (i), THk+1(i), ..., THn(i) as a substitute or updated data in the table. For example, with an addition of the correction amount CR to the pre-correction threshold value THk(i−1), the threshold value THk of the moving speed VMk is corrected to the post-correction threshold value THk(i). According to the present embodiment, the terminal 10 executes the threshold value correction control whenever the HO process is executed. Therefore, the threshold value correction control is executed repeatedly. As a result, the data contents of the table stored in the threshold value storage means 18 are updated gradually. Thus, based on (under-HO process) electric wave states during HO processes undergone in past times, the correction amount CR is calculated such that an electric wave state during a HO process taking place does not fall excessively. Therefore, the decline of the electric wave state during the succeeding HO process is suppressed.

Figure 8:
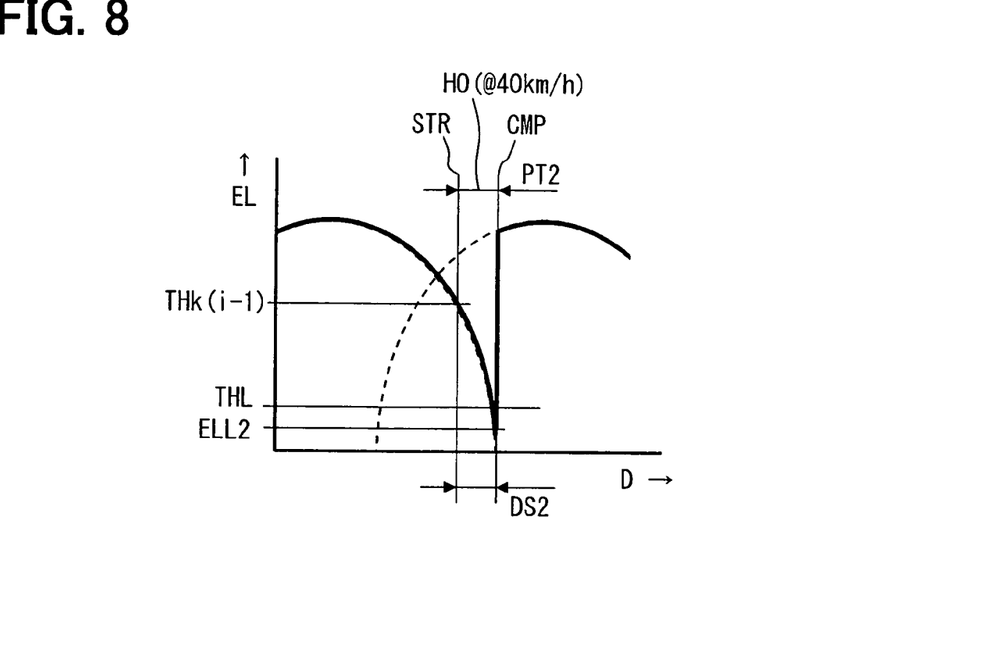
FIG. 8 is a diagram illustrating an electric wave state according to the first embodiment.
Figure 9:
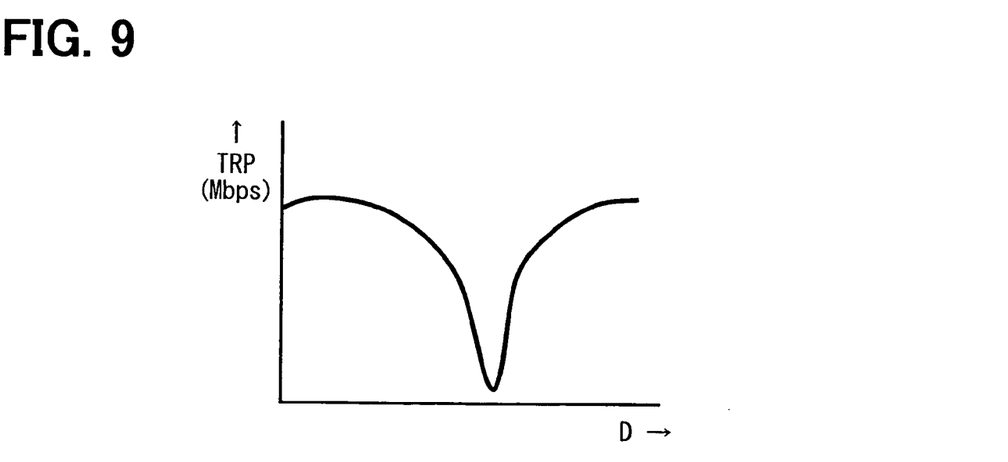
FIG. 9 is a diagram illustrating a throughput in an electric wave state of FIG. 8.
Figure 10:
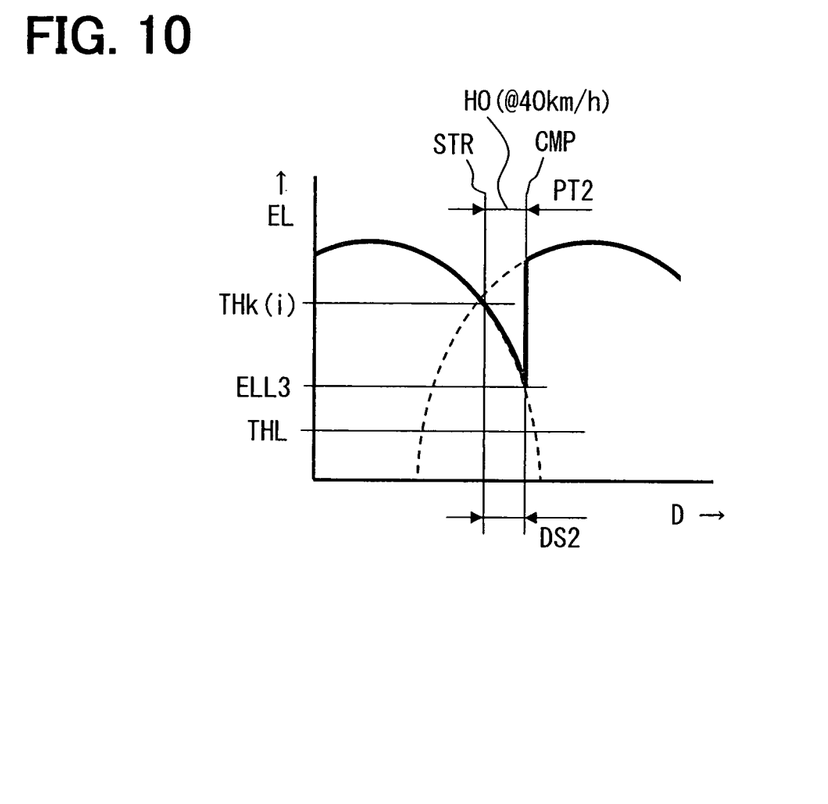
FIG. 10 is a diagram illustrating an electric wave state according to the first embodiment.
Figure 11:
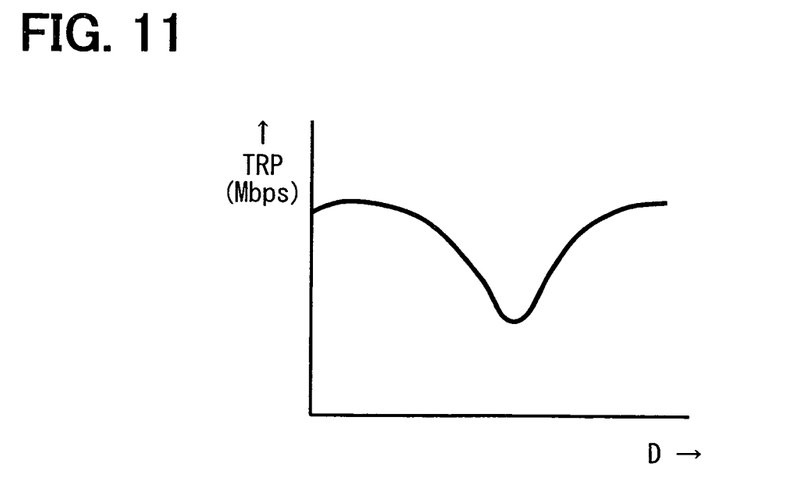
FIG. 11 is a diagram illustrating a throughput in an electric wave state of FIG. 10.

FIG. 8 is a diagram illustrating a pre-correction electric wave state according to the first embodiment. FIG. 9 illustrates a throughput (TRP) of data communications in an electric wave state of FIG. 8. FIG. 10 illustrates a post-correction electric wave state according to the first embodiment. FIG. 11 illustrates a throughput of data communications in an electric wave state of FIG. 10.

As illustrated in FIG. 8, when the HO process is started from the pre-correction threshold value THk (i−1), the electric wave state falls down to the minimum value ELL2. Thereby, the badness of the electric wave state results in the rapid decrease of the throughput of data communications to a low level.

According to the present embodiment, the threshold value THk(i) is corrected to be THk(i−1)<THk(i). As illustrated in FIG. 10, when the HO process is started from the post-correction threshold value THk (i), the HO process is started at an earlier stage. Therefore, the electric wave state falls only down to the minimum value ELL3. Further, the minimum value ELL3 is greater than each of the minimum values ELL2 and the lower limit THL.

According to the present embodiment, the deterioration of the communications quality during the HO process can be suppressed. Further, the threshold value TH is adjusted according to the moving speed VM. Even if the moving speed of the terminal 10 changes, the deterioration of the communications quality during the HO process can be thereby suppressed. Furthermore, the threshold value is corrected based on the under-HO process electric wave states during the HO processes undergone in past times, the excessive deterioration of the electric wave state is suppressed in the succeeding HO process. Even if a factor of varying the electric wave state changes, the deterioration of the communications quality during the HO process can be suppressed.

(Second Embodiment)

Figure 12:
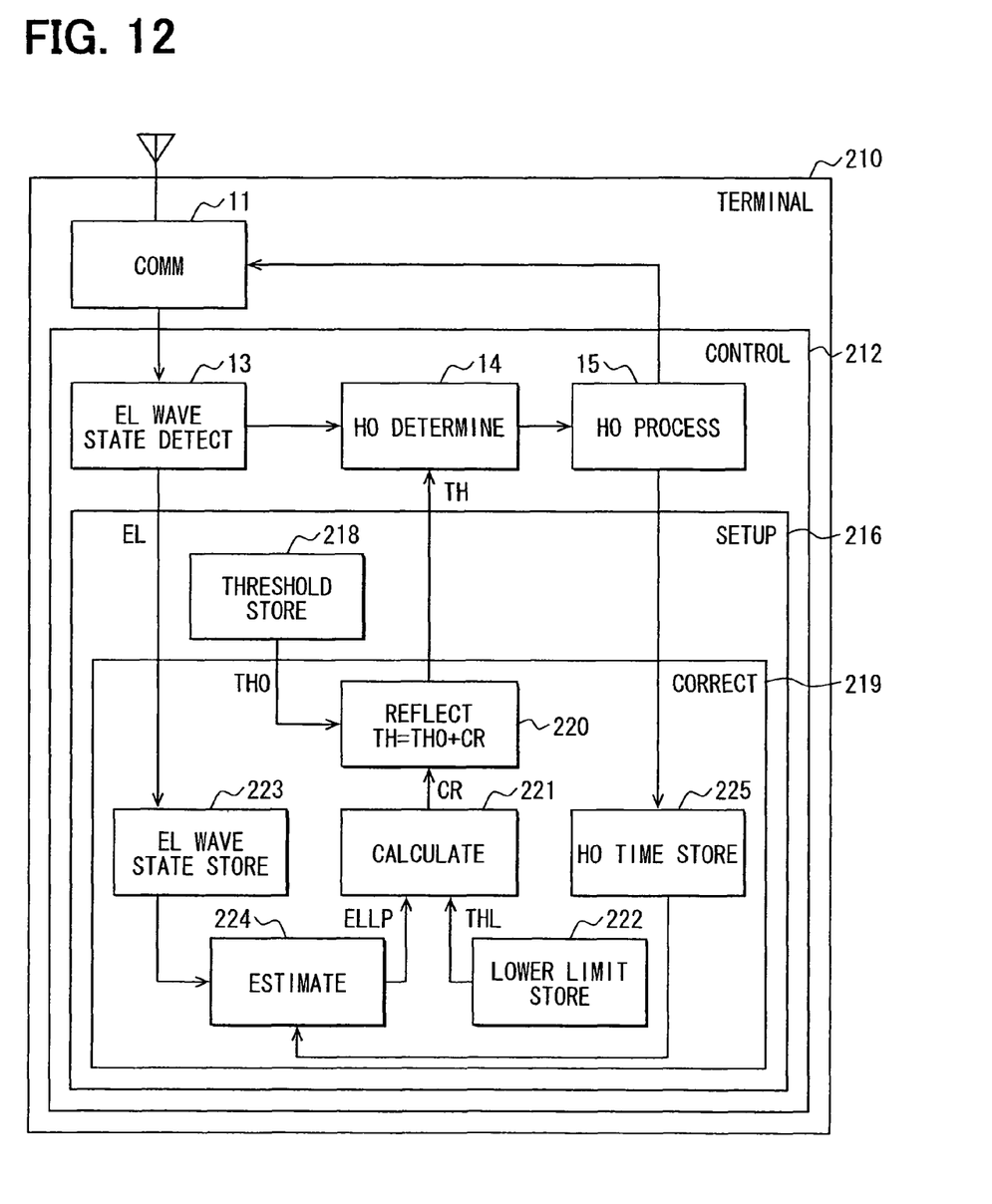
FIG. 12 is a diagram illustrating a configuration of a terminal according to a second embodiment of the present invention.

FIG. 12 illustrates a configuration of a terminal 210 according to a second embodiment of the present invention. The terminal 210 is provided with a control apparatus 212. The control apparatus 212 has a setup means or section 216, which is substituted for the setup means 16 of the first embodiment. The setup means 216 is provided with a threshold value storage means 218 and a correction means 219. The threshold value storage means 218 stores a threshold value TH as a reference value. The correction means 219 corrects the threshold value TH0 stored in the threshold value storage means 218, and supplies the HO determination means 14 with the corrected threshold value TH (also referred to the post-correction threshold value).

The correction means 219 is provided with a reflection means or section 220, a calculation means or section 221, a lower limit storage means or section 222, an electric wave storage means or section 223, an estimate means or section 224, and a HO time storage means or section 225. The reflection means 220 adds a correction amount CR to the threshold value TH0 supplied from the threshold value storage means 218, thereby calculating a threshold value TH. The reflection means 220 supplies the threshold value TH after the correction (referred to as post-correction threshold value) to the HO determination means 14.

The calculation means 221 calculates a correction amount CR. The correction amount CR is calculated based on the estimated electric wave state ELP. The correction amount CR is calculated based on a decrease amount of the estimated electric wave state ELP, that is estimated or predicted to take place during the next HO process, which will be executed. The correction amount CR is made so as to suppress the decline of an actual electric wave state EL during the next HO process. The correction amount CR is calculated so as to maintain the estimated electric wave state ELP during the next HO process higher than a predetermined lower limit THL. The calculation means 221 calculates as a correction amount CR a difference (THL−ELLP) between an estimated minimum electric wave state ELLP and the lower limit THL.

The lower limit threshold value storage means 222 stores the lower limit threshold value THL. The lower limit THL is a predetermined value. The lower limit THL indicates a minimum value of the electric wave state EL which can provide a desirable communications quality. In addition, the lower limit THL indicates an electric wave state EL providing a minimum communications quality demanded from an application, thereby being also called a minimum communications guarantee quality threshold value. The lower limit THL which the lower limit storage means 222 stores can be a fixed value or a variable value. When the lower limit THL is variable, the lower limit storage means 222 can be configured to store a table for setting up the lower limit THL according to a parameter, such as a movement speed VM. In addition, the lower limit THL can be adjusted according to the importance or priority of a presently running application (i.e., an application under execution).

The electric wave storage means 223 stores the electric wave states undergone in past times up to the present time. The electric wave storage means 223 stores past electric wave states EL(i−p), EL(i−p+1), ..., EL(i), which are undergone for the duration of past p seconds up to the present time. The electric wave state EL(i) is a sampling value at the present time, which is also referred to as a present sampling value.

Figure 13:
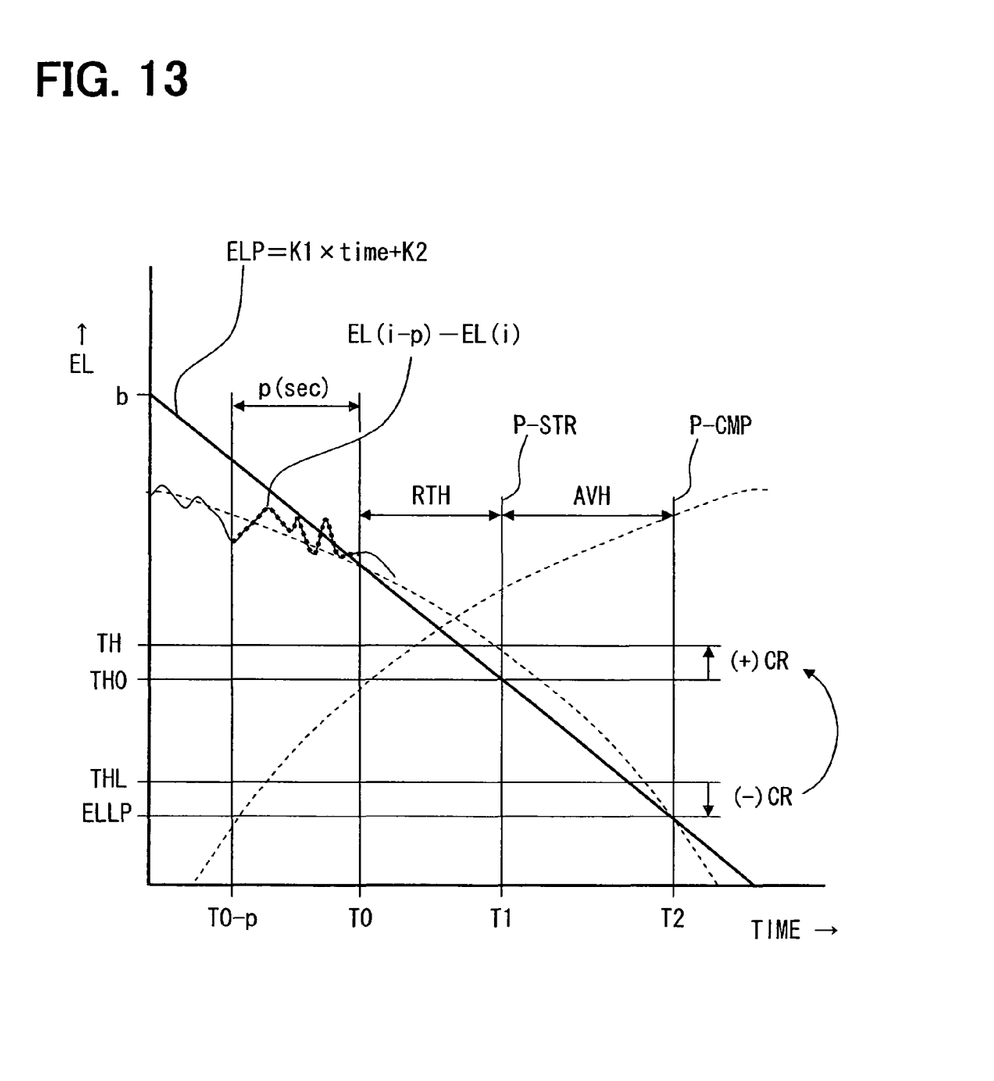
FIG. 13 is a diagram illustrating an electric wave state according to the second embodiment.

The estimate means 224 estimates a future electric wave state based on the past electric wave states stored in the electric wave storage means 223. The estimate means 224 estimates a minimum electric wave state ELLP (also referred to as an estimated minimum electric wave state ELLP) which will take place just before or when the next HO process is completed. The estimate means 224 predicts or estimates the minimum electric wave state ELLP with extrapolation. FIG. 13 illustrates an electric wave state according to the second embodiment.

FIG. 13 covers a duration including before and after the execution (i.e., duration) of the HO process. The electric wave detection means 13 samples electric wave states EL of the base station with which the wireless communications connection is established for predetermined sampling time intervals. The estimate means 224 obtains a simulate function (i.e., a simulate function equation) to simulate a variation of the electric wave state based on the electric wave states EL (i−p), EL (i−p+1), ..., EL(i). The obtained simulate function may use one of the various functions which simulate a decline curve of the electric wave state EL, such as a quadratic function and a parabolic function. In the present embodiment, the simulate function is a linear function expressed by an equation $ELP=f(x)=K1x+K2$. The variable x is a time. The linear function can be obtained using the least-squares method.

Based on the obtained simulate function, a time when the estimated electric wave state ELP falls down to the threshold value TH0 is estimated. That is, a time P-STR when a next HO process is to be started is estimated. Furthermore, if a HO time period for which the HO process is executed is known, a time P-CMP when the HO process is completed can be estimated. Furthermore, based on the threshold value TH0 and the HO time period, the electric wave state ELP at the estimated time P-CMP can be estimated. The estimate means 224 estimates the minimum electric wave state ELLP at the estimated time P-CMP when the next HO process is completed based on the simulate function, the known threshold value TH0, and the known HO time period.

The HO time storage means 225 stores each HO time period taken by each HO process in past T times. The HO time period is a time period from the start time STR to the completion time CMP of the HO process. The HO time storage means 225 provides the estimate means 224 with an average value of those HO time periods as an average HO time period AVH. The average HO time period AVH is used as one of parameters for correcting the threshold value TH. The estimate means 224 obtains the minimum electric wave state ELLP with an equation of $ELLP=TH0+K1 \times AVH$.

Figure 14:
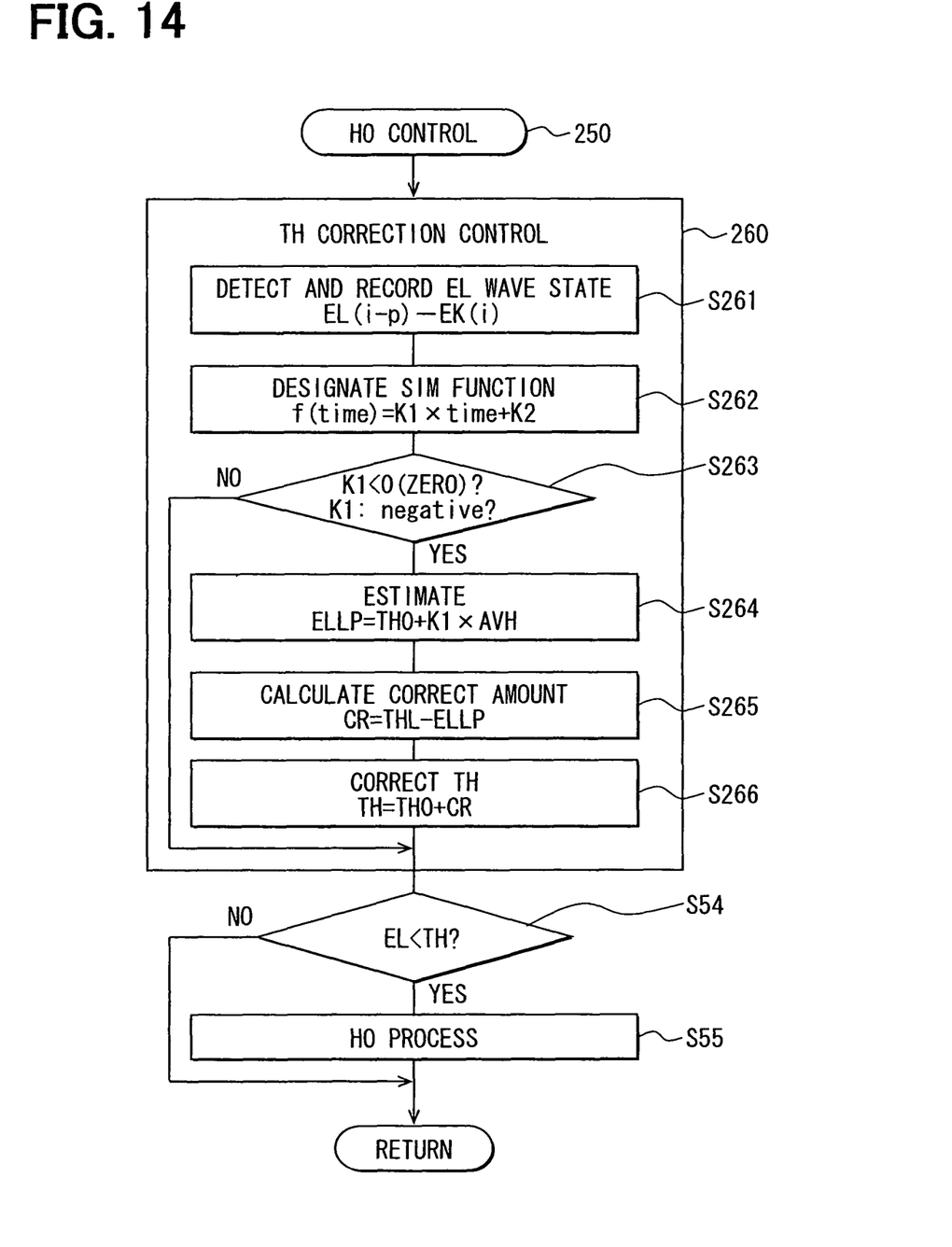
FIG. 14 is a flowchart illustrating a process executed by a terminal according to the second embodiment.

FIG. 14 is a flowchart illustrating a process executed by the terminal 210 according to the second embodiment. The HO control 250 has S54 and S55 identical to those in the first embodiment. In the present embodiment, the threshold value correction control 260 is executed before S54 and S55 for the next HO process, which will be executed newly. Therefore, in the present embodiment, the threshold value correction control 260 is executed before the determination at S54 which determines whether the HO process should be started.

At S261, the control apparatus 212 detects an electric wave state EL, recording the history of electric wave states EL taking place for a predetermined time period. The control apparatus 212 stores past electric wave states EL(i−p), EL(i−p+1), EL(i), which are undergone for the duration of past p seconds up to the present time. At S262, the control apparatus 212 designates a simulate function. For instance, a coefficient K1 and a coefficient K2 of the simulate function are specified. At S263, it is determined whether the coefficient K1 is positive or negative. When the coefficient K1 is negative (i.e., when the simulate function exhibits a tendency to decrease), the processing proceeds to S264. In contrast, the coefficient K1 is zero or positive, the processing proceeds to S54.

At S264, the control apparatus 212 executes the estimate process. In the estimate process, the control apparatus 212 estimates the minimum electric wave state ELLP in the next HO process. The correction amount CR is calculated at S265 as a difference THL−ELLP between the lower limit THL and the estimated minimum electric wave state ELLP. At S266, the threshold value TH0 is corrected using the correction amount CR. The post-correction threshold value TH is used at S54 for comparison with the electric wave state EL. Therefore, the start time of the next HO process is determined based on the threshold value TH corrected according to the estimate process.

In the present embodiment, in order to enable an adjustment of the start time of the HO process, the threshold value TH is provided to be variable. Furthermore, the threshold value TH is set according to the past electric wave states. It can be supposed that the past electric wave states (i.e., naturally before entering the next HO process) estimates the minimum electric wave state ELLP in the next handover process, which will follow. For instance, when a future electric wave state estimated from the past electric wave states is bad enough to reduce the communications quality down to a level below a predetermined value, the threshold value TH used for the next HO process is corrected to be higher. Further, the threshold value TH is corrected to be higher as the estimated minimum electric wave state ELLP in the next HO process exhibits a worse state. As a result, the next HO process is started earlier as the estimated electric wave state during the next HO process becomes worse. In the present embodiment, the past electric wave states are transformed into the estimated minimum electric wave state ELLP in the next HO process, and is reflected on the threshold value TH used in the actual next HO process. This helps prevent the electric wave state EL during the future HO process from falling excessively.

According to the present embodiment, the deterioration of the communications quality during a HO process can be suppressed. Further, a future electric wave state is estimated based on the past electric wave states; the threshold value is corrected such that the excessive deterioration of the electric wave state is suppressed. Even if a factor of varying the electric wave state changes, the deterioration of the communications quality during the HO process can be suppressed.

(Other Embodiments)

The preferred embodiment of the present invention is thus described; however, without being restricted to the embodiments mentioned above, the present invention can be variously modified as long as not deviating from the scope thereof. The configuration of the above embodiments is only an example, but the scope of the present invention is not limited to that of the above embodiments. The scope of the present invention is indicated by the description in claims; furthermore, the scope of the present invention includes all the modifications within the scope and equivalents of the description of the claims.

For example, in the second embodiment, like the first embodiment, the threshold value TH0 may be adjusted according to the moving speed VM.

In addition, in the embodiments mentioned above, the threshold value TH is corrected by the process to add a difference CR between the minimum electric wave state ELL, ELLP and the lower limit THL. Alternatively, only a part of the difference CR may be added. In addition, the threshold value TH is corrected using a ratio calculated from the minimum electric wave state ELL, ELLP and the lower limit THL.

Furthermore, only the terminal 10 is provided with the process means for adjusting or correcting the threshold value TH in the embodiments mentioned above. Alternatively, the process means for adjusting the threshold value TH may be provided in only the fixed station 2, or may be shared by both the fixed station 2 and the terminal 10.

In addition, a means, section, or function which the control apparatus provides can be provided to be a software section alone, to be a hardware section alone, or to be a combination of a software section and a hardware section. For example, the control apparatus may be achieved using an analog circuit.

Aspects of the disclosure described herein are set out in the following clauses.

As an aspect of the disclosure, a handover control apparatus is provided as follows. A setup section is configured to set up a threshold value, which is predetermined. A determination section is configured to determine a start of a handover process when an electric wave state becomes lower than the threshold value. Herein, the electric wave state is between a terminal and a first base station wirelessly connected with the terminal to establish a wireless data communications link; the handover process wirelessly connects the terminal to a second base station different from the first base station. The setup section is further configured to include a correction section to correct the threshold value based on a past electric wave state, which is an electric wave state undergone in past times, so as to reduce a decline of an electric wave state in a following handover process, which is a handover process that will be started.

As an optional aspect of the above handover control apparatus, the past electric wave state may include a minimum electric wave state undergone in a precedent handover process, which precedes the following handover process. Further, the correction section may correct the threshold value to be higher as the minimum electric wave state is decreased more from a lower limit.

According to the configuration, the threshold value can be corrected based on the minimum electric wave state observed in the HO process to precede. Therefore, it is avoidable that the bad electric wave state is repeated.

Furthermore, in the above handover control apparatus, the correction section may include a calculation section to calculate a difference between (i) the minimum electric wave state undergone in the precedent handover process and (ii) the lower limit, and a reflection section to reflect the difference on the threshold value such that as the minimum electric wave state is decreased more from the lower limit, the threshold value becomes higher.

According to the configuration, the correction amount of the threshold value can be set up appropriately.

As an optional aspect of the handover control apparatus, the past electric wave state may indicate a minimum electric wave state, which is estimated in the following handover process. Further, the correction section may correct the threshold value to be higher as the minimum electric wave state estimated in the following handover process is decreased more from the lower limit.

According to the configuration, the threshold value may be corrected based on the estimated minimum electric wave state to be observed in the following HO process. Thereby, it is avoidable that the electric wave state in the following HO process falls excessively.

Furthermore, in the above handover control apparatus, the correction section may include an estimate section to estimate a minimum electric wave state estimated in the following handover process based the past electric wave state, a calculation section to calculate a difference between (i) the minimum electric wave estimated in the following handover process and (ii) the lower limit, and a reflection section to reflect the difference on the threshold value such that as the minimum electric wave state estimated in the following handover process is decreased more from the lower limit, the threshold value becomes higher.

According to the configuration, the correction amount of the threshold value can be set up appropriately.

As an optional aspect of the handover control apparatus, a speed detection section may be included to detect a moving speed of the terminal. Further, a threshold value storage section may be included to adjust the threshold value to be higher as the moving speed becomes greater.

Such a configuration can suppress the difference of the electric wave state in the handover process resulting from the difference in the moving speed.

It will be obvious to those skilled in the art that various changes may be made in the above-described embodiments of the present invention. However, the scope of the present invention should be determined by the following claims.

What is claimed:

1. A handover control apparatus controlling a handover process between a terminal and a first base station wirelessly connected with the terminal to establish a wireless data communications link, the handover process wirelessly connecting the terminal to a second base station different from the first base station, the handover control apparatus comprising:
a threshold value storage section that stores a threshold value of an electric wave state, the stored threshold value being associated with a moving speed that serves as a parameter, the threshold value being varied to be higher as the moving speed becomes greater;
a speed detection section that detects a moving speed of the terminal; and
a central processing unit configuring
a determination section that determines a start of the handover process connecting the terminal to the second base station when an electric wave state becomes lower than the threshold value, which is stored in the threshold value storage section and associated with the moving speed detected by the speed detection section, the electric wave state being between the terminal and the first base station wirelessly connected with the terminal, and
a correction section that corrects the threshold value stored in the threshold value storage section based on a minimum electric wave state, which is an electric wave state undergone in a precedent handover process, which precedes a following handover process being a handover process that will be started, so as to reduce a decline of an electric wave state in the following handover process,
the correction section being further configured to
calculate a difference between (i) the minimum electric wave state undergone in the precedent handover process and (ii) a predetermined lower limit, and
reflect the difference on the threshold value stored in the threshold value storage section such that as the minimum electric wave state is decreased farther from the predetermined lower limit, the threshold value becomes higher to start the handover process at an earlier stage and complete at an earlier stage.

2. The handover control apparatus according to claim 1, wherein
when calculating the difference between (i) the minimum electric wave state undergone in the precedent handover process and (ii) the predetermined lower limit, the correction section reflects the difference on the threshold value that is only associated with each of equal to and greater than the moving speed, which is detected by the speed detection section when the minimum electric wave state is undergone in the preceding handover process.

3. The handover control apparatus according to claim 1, wherein
the threshold value associated with the moving speed serving as the parameter is stored by the threshold value storage section as a table that include a plurality of threshold values to be associated with a plurality of different moving speeds, respectively.

4. The handover control apparatus according to claim 1, wherein
the threshold value associated with the moving speed serving as the parameter is stored by the threshold value storage section as a functional equation using the parameter being the moving speed.

5. A handover control method for controlling a handover process between a terminal and a first base station wirelessly connected with the terminal to establish a wireless data communications link, the handover process wirelessly connecting the terminal to a second base station different from the first base station, the handover control method comprising:

storing, in a threshold value storage section, a threshold value of an electric wave state, the stored threshold value being associated with a moving speed that serves as a parameter, the threshold value being varied to be higher as the moving speed becomes greater;

detecting a moving speed of the terminal using a speed detection section;

determining a start of the handover process connecting the terminal to the second base station when an electric wave state becomes lower than the threshold value, which is stored in the threshold value storage section and associated with the moving speed detected, the electric wave state being between the terminal and the first base station wirelessly connected with the terminal; and correcting the threshold value stored in the threshold value storage section based on a minimum electric wave state, which is an electric wave state undergone in a precedent handover process, which precedes a following handover process being a handover process that will be started, so as to reduce a decline of an electric wave state in the following handover process, wherein when correcting the threshold value stored in the threshold value storage section based on the minimum electric wave state, a difference is calculated between (i) the minimum electric wave state undergone in the precedent handover process and (ii) a predetermined lower limit, and then the calculated difference is reflected on the threshold value stored in the threshold value storage section such that as the minimum electric wave state is decreased farther from the predetermined lower limit, the threshold value becomes higher to start the handover process at an earlier stage and complete at an earlier stage.

6. The handover control method according to claim 5, wherein when calculating the difference between (i) the minimum electric wave state undergone in the precedent handover process and (ii) the predetermined lower limit, the difference is reflected on the threshold value that is only associated with each of equal to and greater than the moving speed, which is detected by the speed detection section when the minimum electric wave state is undergone in the preceding handover process.

7. The handover control method according to claim 5, wherein the threshold value associated with the moving speed serving as the parameter is stored in the threshold value storage section as a table that include a plurality of threshold values to be associated with a plurality of different moving speeds, respectively.

8. The handover control method according to claim 5, wherein the threshold value associated with the moving speed serving as the parameter is stored in the threshold value storage section as a functional equation using the parameter being the moving speed.

9. A program product stored in a non-transitory computer readable storage medium comprising instructions for execution by a computer, the instructions including the method according to claim 5, the method being computer-implemented.

\* \* \* \* \*